United States Patent Office 2,790,827
Patented Apr. 30, 1957

2,790,827

ISOMERIZATION OF MALEIC ACID TO FUMARIC ACID IN THE PRESENCE OF GASEOUS CHLORINE AND NITRIC ACID

Howard David Cummings, St. Louis, and Warn Dean Robinson and James Duffy Sullivan, Webster Groves, Mo., assignors to Monsanto Chemical Company, St. Louis, Mo., a corporation of Delaware No Drawing. Application July 21, 1954,
Serial No. 444,906

11 Claims. (Cl. 260—537)

This invention relates to the preparation of fumaric acid and more specifically pertains to an improved process for producing fumaric acid from aqueous liquors containing maleic acid.

Although fumaric acid can be produced by heating solid maleic acid to 200° C. or above in a closed system, it is frequently desirable to subject an aqueous solution of maleic acid to a catalytic inversion process. The present invention embodies the discovery that the quality of fumaric acid obtained from such a process using inversion catalysts may be substantially improved when nitric acid and chlorine are present in the reaction mixture during the catalytic inversion, particularly when hydrochloric acid is employed as the inversion catalyst. Moreover by following the practices of this invention, it is possible to obtain high quality fumaric acid from crude maleic acid solutions or liquors.

It is well known in the art that the inversion of maleic acid to fumaric acid is accelerated by various inorganic catalysts such as iodine, bromine, hydrochloric acid, hydrobromic acid, sulfuric acid, potassium thiocyanate and sodium bromide. Hydrochloric acid is a very efficient inversion catalyst and is soluble in the crude aqueous solution of maleic acid. Such a process for the preparation of fumaric acid involves heating an aqueous solution of maleic acid containing hydrochloric acid or other inversion catalysts such as an inorganic catalyst given above. As the inversion process progresses and fumaric acid is formed, the fumaric acid crystallizes out of the reaction mixture because of its low solubility in the reaction mixture and the fumaric acid crystals are subsequently recovered by filtration or by centrifuging.

When pure maleic anhydride is added to water to form an aqueous solution of maleic acid such a solution can be heated in the presence of, e. g. hydrochloric acid as an inversion catalyst to produce fumaric acid. Such an inversion process generally produces a very white fumaric acid.

However, when an attempt is made to produce fumaric acid directly from crude maleic acid solutions by such a process the recovered fumaric acid is generally of exceedingly poor quality and has a color varying from yellow to dirty gray and to tan rather than being substantially white as required for use in the preparation of such resinous material as the polyesters which are the products of the condensation of fumaric acid with a polyhydroxy compound such as the glycols. More precisely the fumaric acid should be sufficiently free from the color bodies so that a 5% by weight solution thereof in ethanol will have a color or color intensity not exceeding about an APHA No. 12 on the Hazen scale.

To obtain a high quality fumaric acid by the isomerization of solutions of crude maleic acid, various alternatives are available such as to first subject the crude maleic acid solution to elaborate purification methods to obtain a high quality maleic acid and re-dissolving said maleic acid before inversion, or to perform expensive and time consuming purification operation conditions on the off quality fumaric acid in order to obtain a product of satisfactory or usable quality, and to dehydrate these crude maleic acid solutions to form maleic anhydride, purify the maleic anhydride and reform a maleic acid solution from the purified anhydride. Any of these three alternatives add exceedingly to the ultimate cost of the maleic acid. The improvement in the catalytic inversion of the maleic acid achieved by following the practices of this invention makes it possible to obtain a high quality fumaric acid of a substantially snowy white color from crude maleic acid solutions without having to extensively purify the crude maleic acid solution or the final fumaric acid product.

It has now been discovered that a substantially improved fumaric acid product can be produced by the direct isomerization or inversion of maleic acid contained in a relatively impure maleic acid solution employing a conventional inversion catalyst, particularly hydrochloric acid. The fumaric acid produced according to this inversion is sufficiently free of contaminating color bodies that a 5% solution thereof in ethanol has a color on the Hazen scale corresponding to APHA number of less than 10 being in the range of 4 to 7.

According to this invention, the maleic acid contained in a crude maleic acid solution is directly isomerized to fumaric acid in the presence of nitric acid and chlorine in addition to conventional isomerization catalysts of which hydrogen chloride is preferred and which is present in the aqueous reaction mixture as hydrochloric acid. The hydrochloric acid can be added to the maleic acid solution at any time either prior to or with the addition of nitric acid during the isomerization step, but generally no advantage is to be gained by adding it before the maleic acid solution is at a temperature of at least 50° C.

As is known to those skilled in the art, maleic acid is generally derived from maleic anhydride which in turn may be made in various ways but usually by the catalytic oxidation of benzene or other suitable hydrocarbons. There may be used in the process of this invention crude maleic acid solutions derived from various sources, e. g. solutions obtained by dissolving crude maleic acid in water liquors obtained through the recovery and/or purification of maleic acid, the removal of maleic anhydride from gaseous mixtures thereof with phthalic anhydride, etc.

The maleic acid solutions used in the process of this invention may vary substantially in concentration but generally contain about 40 to 80% by weight maleic acid. Preferred solutions are those containing 55 to 75% by weight maleic acid.

In some cases where the crude maleic acid solutions are unusually impure, the fumaric acid made from such solutions by the practice of this invention may have a yellow color even though nitric acid and chlorine were present during the inversion. In such cases it has been found that the quality of the fumaric acid produced from these unusually impure maleic acid solutions can be still further improved by also concentrating the maleic acid solutions in the presence of nitric acid and chlorine as well as having nitric acid and chlorine present during the inversion step. For in the quantities employed in the process of this invention neither nitric acid nor chlorine will cause a perceptible inversion of maleic acid during the concentrating process. Also when very dark colored maleic acid solutions are used in the process of this invention, it will be found desirable to first heat these solutions from about 50° C. to 120° C. with a decolorizing carbon, such as activated carbon, in an amount of from 1% to 3% by weight, filtering the solutions so treated, and then charging them to the concentration step and/or conversion step.

In the preferred process of this invention, the concentrated maleic acid solution is cooled to about 65° C., hydrochloric acid is added to the cooled concentrate, the resulting aqueous solution is heated to reflux and maintained under reflux conditions all while slowly and continuously adding nitric acid and chlorine to the concentrate. The reaction is continued under reflux until essentially all the fumaric acid has been precipitated during which time both nitric acid and chlorine are slowly and continuously added to the isomerization medium. The flow of nitric acid and chlorine into the isomeirzation medium is controlled so that the total quantity of nitric acid added during the inversion of maleic acid amounts to about 0.2% to 2% or more by weight of $HNO_3$ and the total amount of chlorine added is about 0.2% to 2% or more by weight, all percentages being based on the weight of maleic acid originally present. After the reflux period is completed, the flow of nitric acid and chlorine is stopped and the isomerization medium cooled to room temperature. The fumaric acid crystals are then recovered preferably by filtration or centrifuging, washed with cold water and dried. By this preferred process fumaric acid having a substantially snowy white color is obtained in yields of 90% or more based on the maleic acid in the original liquors. The process of this invention can also be carried out by adding the hydrochloric acid to the maleic acid solution at a temperature below 65° C., say 30° C. to 50° C. or above 65° C.

For optimum results with respect to rate of reaction, quality and yields of maleic acid, it is preferred to adjust the concentration of maleic acid solution so that after the addition of hydrochloric acid the isomerization medium contains for each 100 parts by weight of maleic acid, 5 to 20 parts by weight of HCl and from 25 to about 125 parts by weight of water. Depending upon convenience, the hydrogen chloride may be added to the reaction mixture in the form of hydrogen chloride gas or in the form of hydrochloric acid. However, when hydrochloric acid is added to the reaction mixture the water present must be taken into account so that the reaction mixture after the addition of hydrochloric acid will contain maleic acid and water within the preferred ranges hereinbefore set forth.

Due to the fact that fumaric acid has a very low solubility in the acidic aqueous inversion medium, the fumaric acid separates from the inversion medium in the form of fine crystals substantially as quickly as the fumaric acid is formed. Hence, the reaction mixture ultimately becomes a heavy slurry of fine crystalline fumaric acid. The proportions of maleic acid, HCl and water as above indicated provide a maximum conversion of maleic acid to fumaric acid and readily processible slurry from which yields up to 95% or more of high quality fumaric acid can be obtained.

Aside from the preferred proportions of maleic acid, HCl and water hereinbefore set forth, this invention can be practiced by employing isomerization medium containing for each 100 parts by weight of maleic acid from 2 parts by weight of hydrogen chloride up to the saturation of HCl under the particular conditions selected.

In the practice of this invention, it is preferred to add the nitric acid and the chlorine to the maleic acid solution containing hydrochloric acid during the inversion reaction while the temperature of the inversion medium is maintained at about reflux temperature which, of course, will vary with the concentration of the dissolved materials in the medium. In general the reflux temperature will be about 105° C. to about 120° C. at atmospheric pressure. However, if desired the temperature of the isomerization medium may be varied between 50° C. and 150° C. during the isomerization reaction and while the nitric acid and chlorine are being added to the reaction medium. Also, when the process of this invention is being carried out at pressures above the atmospheric pressure, higher reaction temperatures may be employed, i. e., 125° C. to 200° C.

The following examples are employed to illustrate the practice of this invention as well as the improved results obtained by the practices of this invention. It is not intended that the scope of this invention be limited to the precise conditions and proportions hereinafter set forth, for it is to be understood that the proportions herein given may be varied as desired and dictated by the size of reaction equipment. Furthermore, the reaction conditions may be varied as hereinbefore set forth.

The first five examples which follow illustrate the isomerization of maleic acid to fumaric acid by prior art processes employing aqueous maleic acid solutions but which do not employ nitric acid nor chlorine during isomerization.

Example I 1300 parts of a crude aqueous solution containing 339 parts of maleic acid (26% by weight) are concentrated by distillation at atmospheric pressure until the maleic acid content is about 69% by weight, boiling point 113° C. While maintaining the concentrate at its reflux temperature 145 parts of 22° Bé., hydrochloric acid (35% by weight HCl) were added. The resulting aqueous solution contained about 58% by weight maleic acid and 51 parts of HCl. This resulting concentrate was maintained under reflux conditions for about 2 hours during which time fumaric acid crystals separated from the reaction mixture. At the end of the reflux period, the reaction mixture was cooled to room temperature about 27° C. and the fumaric acid crystals were separated therefrom by filtration, washed and dried. The fumaric acid thus obtained was a brownish tan in color and was otherwise of poor quality.

Example II

The process described in Example I was repeated except that the first concentrate was cooled to about 80° C. and treated with 7 parts of activated charcoal for about 15 minutes at 80° C. The resulting aqueous mixture was filtered and the filtrate heated to reflux with the hydrochloric acid. The fumaric acid recovered from this process was only slightly improved in color over the product of Example I and was also a low grade of fumaric acid.

Example III

The process of Example II was repeated except that 3.5 parts of $HNO_3$ as 43.5° Bé. nitric acid were added to the crude solution before concentration thereof. The fumaric acid obtained from this process had a light yellow to tan color and a 5% by weight solution thereof in ethanol had a color on the Hazen scale of APHA No. 18.

Example IV

The process described in Example I was repeated except that 705 parts of a black crude aqueous solution containing about 41% by weight maleic acid was concentrated to a maleic acid content of about 69% by weight and then treated as described in Example I. The fumaric acid obtained from this process was dark brown.

Example V

The process described in Example II was repeated except that 705 parts of a crude liquor such as described in Example IV were employed. Again the fumaric acid recovered was very dark in color.

The following examples will illustrate the process of this invention.

Example VI

A crude aqueous solution containing 50% by weight maleic acid and having a dark brown color is heated with 2% by weight of decolorizing carbon at 90° C. for about 45 minutes. The resulting clear brown solution is filtered while hot.

523 parts of this carbon treated crude aqueous solution of maleic acid is concentrated to a maleic acid content of about 65%, boiling point 110° C., by distilling off water at atmospheric pressure in the presence of 7 parts of 70% nitric acid added stepwise at the rate of 0.7 part every six minutes over a period of about one hour. To this concentrated solution there is added 87.2 parts of 36% HCl resulting in an aqueous mixture containing about 55% by weight maleic acid and the resulting aqueous mixture is heated to boiling and maintained under reflux conditions for 1.75 hours while adding 70% nitric acid at the rate of 0.7 part each 15 minutes and while bubbling chlorine slowly through the boiling solution.

Fumaric acid crystals precipitate from the aqueous mixture substantially as soon as the hydrochloric acid is added, and continues to form during the reflux period. The resulting slurry is filtered and the filter cake washed with water and dried at 110° C. From this process there is recovered 237 parts of dry fumaric acid, a yield of 95% based on the original maleic acid charged. The color of an ethanol solution containing 5% by weight of this product corresponds to an APHA number 7 on the Hazen scale.

The amount of $HNO_3$ added as nitric acid solution to the concentration step is equivalent to 2.7% based on the original maleic acid charged while the amount of $HNO_3$ added during the inversion step amounts to 2.2% on the same basis. The chlorine used during the inversion step is 1.5% based on the original maleic acid charged.

*Example VII*

To 1000 parts of an aqueous maleic acid solution containing 22.7% by weight maleic acid there is added 20 parts of "Norite A" (a decolorizing carbon) and the resulting mixture heated to a temperature of from 90° to 100° C. for 45 minutes, filtered, the filter cake washed with hot water and the hot water wash and the filtrate combined. 889 parts of the resulting light yellow solution of maleic acid which contains 22.7% maleic acid, are concentrated by distilling off water while continuously adding in a nitric acid solution containing 70% $HNO_3$ and while bubbling chlorine through the boiling aqueous solution. In about 90 minutes the maleic acid concentration is about 66%, as indicated by a boiling point of 111° C. About 3.8% $HNO_3$ based on the original maleic acid is added during this concentration step.

The resulting concentrate is cooled to about 65° C., 70 parts of hydrochloric acid containing 36% HCl is added thereto forming an aqueous solution containing about 55% maleic acid.

This acidified maleic acid solution is heated to boiling under reflux conditions and maintained thereunder for about 3 hours while bubbling chlorine into the boiling solution and continuously and slowly adding an aqueous solution containing 70% by weight $HNO_3$ at such a rate that 2.1% by weight of $HNO_3$ based on the maleic acid are added. The total amount of chlorine added during the concentration and the inversion step is 2.3% by weight based on the amount of maleic acid originally charged.

The slurry of fumaric acid obtained from the boiling of the acidified maleic acid solution is cooled to about 90° C., filtered to recover the crystalline fumaric acid, the filter cake washed and dried. The dried fumaric acid from the above process represents a yield comparable to that of Example VI. A 5% by weight solution of this fumaric acid in ethanol has a color of less than 5 APHA on the Hazen scale.

*Example VIII*

The process described in Example VII is repeated except that the dark crude maleic acid solution is heated with decolorizing carbon to a temperature of 82–86° C., cooled to 45° C., filtered, the filter cake washed with water and the water wash combined with the first filtrate. The resulting light yellow solution containing 21% maleic acid is concentrated to a maleic acid content of 67%, boiling point 112° C. while bubbling therethrough about 1% by weight of chlorine based on the maleic acid and while adding about 4.5% $HNO_3$. The concentrate is thereafter acidified with about 64 parts of 36% HCl, heated to boiling, maintained under reflux conditions for about 3 hours while about 1.6% by weight of chlorine based on maleic acid is bubbled into the boiling solution and while 4.5% of $HNO_3$ as an aqueous solution is slowly and continuously added. The yield of washed and dried fumaric acid recovered from this process is comparable to that of Example VI. A 5% solution of this fumaric acid product in ethanol has a color of less than 5 APHA on the Hazen scale.

*Example IX*

The process of Example VIII is repeated except that HCl is added during the isomerization step by bubbling HCl into the hot concentrate. An excellent yield of fumaric acid comparative to that of Example VI is obtained. A 5% by weight solution of this fumaric acid in ethanol has a color corresponding to an APHA No. 5 on the Hazen scale.

*Example X*

The process of Example VI is repeated except that the crude maleic acid solution was heated to about 80° C. and this hot solution is passed through a ⅜" column 6" long packed with activated carbon. The hot crude solution is recycled through this packed tube for about 50 minutes. Thereafter resulting clear brown solution is concentrated in the presence of nitric acid and chlorine and converted to fumaric acid in the presence of nitric acid, chlorine and hydrochloric acid as in Example VI. An excellent yield of fumaric acid is obtained. A 5% solution of this fumaric acid in ethanol has a color corresponding to an APHA No. of 6 on the Hazen scale.

*Example XI*

The process of Example VI is repeated except that the concentration and conversion steps are carried out under a pressure of 40 lbs. per sq. in. and at a temperature of about 140° C. A yield of fumaric acid in excess of 95% is obtained by this process. A 5% solution of this fumaric acid in ethanol has a color corresponding to an APHA number of 5 on the Hazen scale.

What is claimed is:

1. In a process for the conversion of maleic acid to fumaric acid carried out in the presence of an inorganic isomerization catalyst, the improvement comprising isomerizing maleic acid to fumaric acid in the presence of nitric acid and chlorine in addition to an inorganic catalyst for said isomerization.

2. In a process for the conversion of maleic acid to fumaric acid carried out in the presence of HCl as the isomerization catalyst, the step comprising isomerizing maleic acid in an aqueous solution in the presence of nitric acid and chlorine in addition to HCl as the isomerization catalyst.

3. In a process for the conversion of maleic acid to fumaric acid, the step comprising continuously adding nitric acid and chlorine to an aqueous solution of maleic acid containing HCl as the isomerization catalyst.

4. In a process for the conversion of maleic acid to fumaric acid, the step comprising heating aqueous solution of maleic acid containing hydrochloric acid while continuously adding nitric acid and chlorine thereto.

5. The process of claim 4 wherein the aqueous solution of maleic acid is heated to a temperature within the range of from 50° C. to 150° C.

6. The process of claim 4 wherein the hydrochloric acid is added to the aqueous solution of maleic acid at 60° C. heating the resulting solution to reflux temperature and maintaining the aqueous solution under reflux conditions.

7. In a process for the conversion of maleic acid to fumaric acid, the steps comprising heating an aqueous solution of maleic acid contacting the said solution with activated carbon, separating the solution from said carbon, adding hydrochloric acid to the resulting maleic acid solution, continuing the heating of said solution to its reflux temperature and while maintaining the solution at its reflux temperature, adding nitric acid and chlorine thereto.

8. The process of claim 7 wherein the aqueous maleic acid solution is contacted with activated carbon at a temperature of about 80° C. for a time sufficient to clarify said solution.

9. In a process for producing fumaric acid by the catalytic isomerization of maleic acid contained in a crude aqueous solution thereof, the steps comprising contacting a crude aqueous solution of maleic acid at a temperature of from about 50° C. to 120° C. with from about 1% to 3% by weight of a decolorizing carbon to clarify the crude maleic acid solution, separating the resulting clarified maleic acid solution from the carbon, concentrating the clarified crude maleic acid solution by the removal of water to a concentration of from about 50% to about 80% by weight of maleic acid, adding to this concentrate from about 5 to about 20 parts by weight of HCl for each 100 parts by weight of maleic acid therein and heating this acidified solution to its reflux temperature while adding from about 0.2% to 2% by weight of nitric acid and chlorine thereto.

10. The process of claim 9 wherein nitric acid and chlorine are added during the concentrating step.

11. In a process for producing fumaric acid by the catalytic isomerization maleic acid contained in a crude aqueous solution thereof, the steps comprising heating said crude aqueous solution in the presence of activated carbon at a temperature of about 80° C. to clarify said crude solution, separating the clarified crude solution from the carbon, concentrating the clarified solution of maleic acid in the presence of nitric acid and chlorine to a maleic acid content of from about 50% to about 80% by weight, adding to the resulting concentrate from about 5 to about 20 parts by weight of HCl at a temperature of at least 50° C. and heating the resulting acidified solution to its reflux temperature while adding nitric acid and chlorine thereto, wherein the total amount of $HNO_3$ is from about 0.2% to 2% by weight and the total amount of chlorine added is about 0.2% to 2% by weight during the isomerization step.

References Cited in the file of this patent

UNITED STATES PATENTS

| | | |
|---|---|---|
| 1,914,556 | Conover | June 20, 1933 |
| 2,208,519 | Spence et al. | July 16, 1940 |
| 2,704,296 | Dobratz | Mar. 15, 1955 |

OTHER REFERENCES

Kekule-Liebig's Annelen, Supplement 2, pp. 93–4 (1862–3).